US005543581A

United States Patent [19]

Kurata et al.

[11] Patent Number: 5,543,581

[45] Date of Patent: Aug. 6, 1996

[54] BRANCHING CONNECTION BOX FOR ELECTRICAL CIRCUITS

[75] Inventors: Kazunori Kurata; Makoto Kobayashi, both of Yokkaichi, Japan

[73] Assignee: Sumitomo Wiring Systems, Ltd., Japan

[21] Appl. No.: 347,111

[22] Filed: Nov. 23, 1994

[30] Foreign Application Priority Data

Nov. 29, 1993 [JP] Japan .................................. 5-298293

[51] Int. Cl.[6] .............................................. H02G 3/08

[52] U.S. Cl. ........................... 174/52.1; 439/212; 307/9.1

[58] Field of Search ........................... 174/18, 52.1, 68.2, 174/60, 59, 64; 439/212, 213; 307/9.1, 10.1

[56] References Cited

U.S. PATENT DOCUMENTS

| | | | |
|---|---|---|---|
| 4,008,366 | 2/1977 | Geyer | 174/88 B |
| 4,678,253 | 7/1987 | Hicks, Jr. et al. | 439/210 |
| 4,959,018 | 9/1990 | Yamamoto et al. | 439/76 |
| 5,038,050 | 8/1991 | Minoura | 307/10.1 |
| 5,162,616 | 11/1992 | Swaffield et al. | 174/99 B |
| 5,207,591 | 5/1993 | Ozaki et al. | 439/212 |

*Primary Examiner*—Kristine L. Kincaid
*Assistant Examiner*—Robert J. Decker
*Attorney, Agent, or Firm*—Banner & Allegretti, Ltd.

[57] ABSTRACT

An electrical assembly includes a housing containing a plurality of electrical components constituted by blocks, each block having a bus-bar and a protruding electrical connection. The electrical connections coincide substantially at the centre of the housing in a stack and are fastened together to directly connect the bus-bars. Preferably, the electrical connections are connected by a screw and bolt fastener passing through aligned apertures of the connections.

14 Claims, 6 Drawing Sheets

BRANCHING CONNECTION BOX FOR ELECTRICAL CIRCUITS

BACKGROUND AND SUMMARY OF THE INVENTION

The present invention relates to a branching connection box for electrical circuits such as a junction box provided in mid course in a wiring harness of an automobile. More specifically the invention concerns a connection box in which the internal electrical components housed therein are separated and divided into a plurality of blocks and housed in various block cases, and the separate blocks are electrically connected directly with each other via bus-bars.

In the past, in order to facilitate the work of assembling a device having a plurality of electrically branching circuit parts in a branching connection box (such as a junction box), the device has been separated into a plurality of electrical components constituted by blocks. Separate bus-bars have been initially attached to block cases, and the individual blocks have been assembled into a branching connection box.

For example, in the junction box 1 shown in FIG. 11 of the accompanying drawings there are three separate blocks A, B and C which are incorporated into a housing 2 of a junction box 1.

The separate blocks A, B and C are connected electrically by a method employing sub-leads, or by a method using screws to fasten together the bus-bars protruding from the separate blocks.

The above-mentioned method employing sub-leads involves the provision of couplers A-1, B-1 and C-1 in the blocks A, B and C. As shown in FIG. 12, sub-lead 3 is provided having connectors a, b and c attached to the tips of branching wires W1, W2 and W3. The connectors a, b and c are connected in use to respective couplers A-1, B-1, C-1 on the outsides of the blocks, and a wire W4 linked to the branching wires W1, W2 and W3 of the said sub-lead 3 is typically connected to an external power source.

FIG. 13 shows by way of example, the method of using screws to fasten together the bus-bars. The bus-bar 4*a* of the block A extends to the blocks B and C respectively; the bus-bars 4*b* of the block B and the bus-bar 4*a* are fastened by screwing at point P1, the bus-bar 4*c* of the block C and the bus-bar 4*a* are fastened by screwing at point P2, and the bus-bar 4*a* is connected to an external power source.

The existing method employing sub-leads has problems in that it increases the dimensions of the branching connection box because it requires the provision of couplers in the block cases of each block and it requires a space for housing the branching wires and sub-lead connectors.

Furthermore, the latter method using screws to fasten together the bus-bars has problems in that it requires laborious assembly work because there are two screw fastening locations P1 and P2 when the separation is into three blocks as shown in FIG. 13, the screw fastening locations increase commensurately as the number of separate blocks increases, and in that it again increases the dimensions of the branching connection box due to the space taken up by the screw-fastening portions.

The present invention aims to resolve the above-mentioned problems by providing an application and method wherein the bus-bars of separate blocks are directly connected with each other, and specifically to provide a single fastening location even in junction boxes having three or more units to be connected. The invention also facilitates assembly of such boxes, reduces the dimensions thereof and can achieve common use of busbars and block cases of separate blocks.

In order to achieve the above-mentioned aims, the present invention provides an electrical assembly comprising a housing, a plurality of electrical components constituted by blocks and arranged within the housing, each electrical component having an electrical connection protruding therefrom, the respective electrical connections coinciding substantially at the centre of said housing in a stack and being fastened together directly to electrically connect said components.

Preferably, the terminals include a respective aperture, the aperture being aligned in the stack and connected by a fastener, preferably a screw and nut fastener, passing therethrough.

Each block is placed in the housing, the block cases and bus-bars thereof being formed in such a way that the electrical terminals of the bus-bars projecting from the above-mentioned blocks are positioned in the centre of the housing.

In a preferred embodiment bus-bar projection openings from which the electrical terminals of the bus-bars project are provided in portions of the block cases of the separate blocks corresponding to the approximate centre of the housing, the electrical terminals of the bus-bars of the blocks projecting from the said bus-bar projection openings being stacked at the approximate centre of the housing and positioned so as to stack on the top surface of a nut fixed on one of the above-mentioned blocks. The terminals are fastened by passing a screw through screw holes formed in advance in the terminals of the bus-bars, the screw engaging the nut.

A configuration is preferably adopted in which the block cases of the above-mentioned separate blocks have identical shapes, bus-bar projection openings are provided in four corners of the said block cases, the electrical terminals of the bus-bars project from the said bus-bar projection openings, and, even when the orientations of the blocks in the housing are different, the electrical terminals of the bus-bars can be adapted to stack in one location in the approximate centre of the housing.

When three separate blocks are incorporated in the above-mentioned housing, a first block is preferably housed in one half of the housing and two identically shaped second and third blocks are housed in the other side; the electrical terminal of a bus-bar projects from a portion of the above-mentioned first block positioned in the centre of the housing, while, in both the second block and the third block, the electrical terminals of the bus-bars project into the centre of the housing in orientations altered by 180 degrees.

A configuration in which the above-mentioned block cases are given identical shapes allows common use of block cases and bus-bars, assuming identical electrical wiring circuits in the said blocks, using identical bus-bars (used after cutting unnecessary parts if necessary), the electrical terminals of the bus-bars projecting from the blocks symmetrically.

Preferably, the blocks are rectangular, the terminals projecting from each corner of each block.

It is preferable that longitudinal bus-bars are adopted as the bus-bars are attached to the above-mentioned blocks, and that the screw fastening takes place in one direction with respect to the electrical terminals of the bus-bars in a perpendicular direction.

In the housing of the present invention, the bus-bars are first attached to the block cases of the separate blocks and the electrical terminals of the said bus-bars are adapted to project from the respective block cases. These blocks are incorporated in predetermined positions inside the housing. At this time, a block to which a nut may have been previously attached is incorporated in such a way that the nut is positioned to be at the outside edge of the stack of electrical terminals.

Once all the blocks have been incorporated and the electrical terminals are stacked in the centre of the housing, a screw is inserted through the holes in the electrical terminals and screwed onto the nut to effect a fastening link.

Of the bus-bars directly connected in the way described above, one of the bus-bars is connected to an external power source by another screw fastening.

Because the electrical terminals of the bus-bars projecting from the separate blocks as described above have an arrangement whereby they are stacked in one location in the centre of the housing, there need only be one screw-fastening location and there need only be one screw-fastening operation as well. Furthermore, because there is only one screw-fastening location, the dimensions of the housing can be reduced.

BRIEF DESCRIPTION OF THE DRAWINGS

Other features of the invention will be apparent from the following description of several preferred embodiments shown by way of example only with reference to the accompanying drawings in which.

DETAILED DESCRIPTION OF THE PREFERRED EMBODIMENTS

In a first embodiment illustrated with reference to

Figure 1:
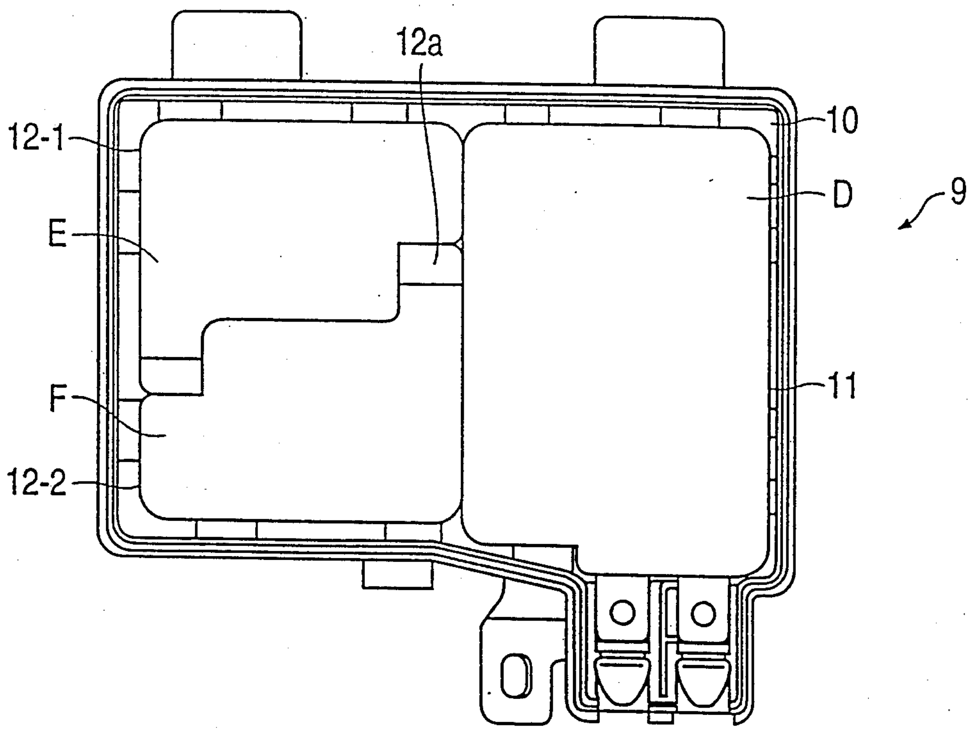
FIG. 1 is a plan view of a branching connection box according to a first embodiment of the present invention.
Figure 2:
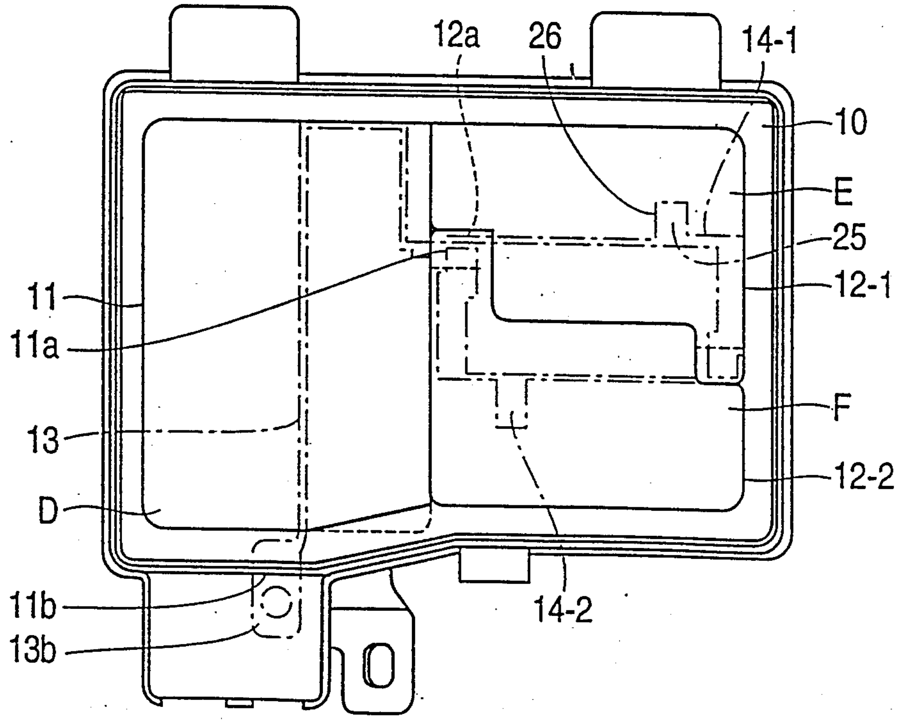
FIG. 2 is a view of the underside of the embodiment of FIG. 1.

FIGS. 1 and 2, three separate blocks D, E and F are incorporated in a housing 10 of a junction box 9. FIG. 2 is a view of the underside and shows block D on the ieft side of the housing 10, and the identically shaped blocks E and F on the right side.

The above-mentioned blocks D, E and F are all arranged in such a way as to connect with the terminals of a fuse block (not shown) by inserting bus-bars 13, 14-1 and 14-2 in the longitudinal directions inside the block cases 11, 12-1 and 12-2 and positioning a plurality of tabs 25 provided on these bus-bars at tab connection openings 26 (shown in outline in FIGS. 1 and FIG. 2) formed in the block cases.

Figure 3A:
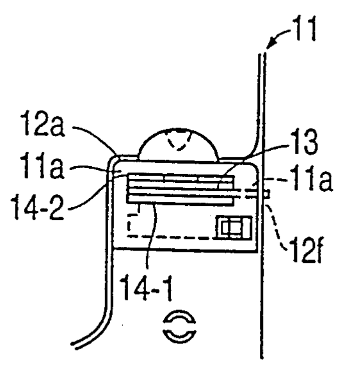
FIGS. 3*a* and 3*b* show the electrical connections of the bus-bars of one embodiment in the linked state, (3*a*) being a plan view and (3*b*) being cross section through the fastener.
Figure 3B:
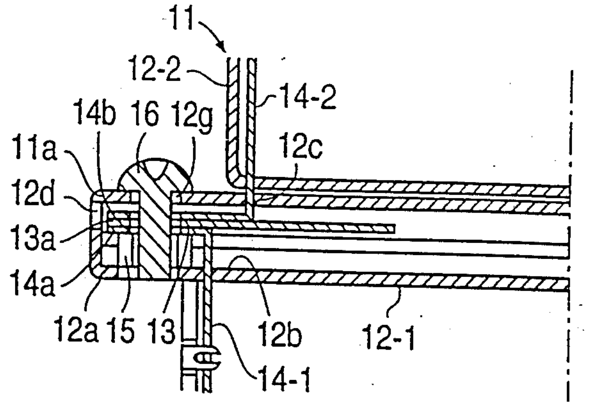

The block case 11 of the block D is rectangular as shown in the figures, and is provided with a bus-bar projection opening 11*a* roughly in the centre of the side which is positioned towards the centre when it is incorporated in the housing 10, and, as shown in FIG. 3, the electrical connection 13*a* of the bus-bar 13 projects from the said bus-bar projection opening 11*a*. Furthermore, a power source insertion opening 11*b* is provided on another side surface of the block case 11, and the input portion 13*b* of the bus-bar 13 in use projects from the said power source insertion opening 11*b* and is connected in use by screw fastening to a wire connected to the external power source.

Figure 4A:
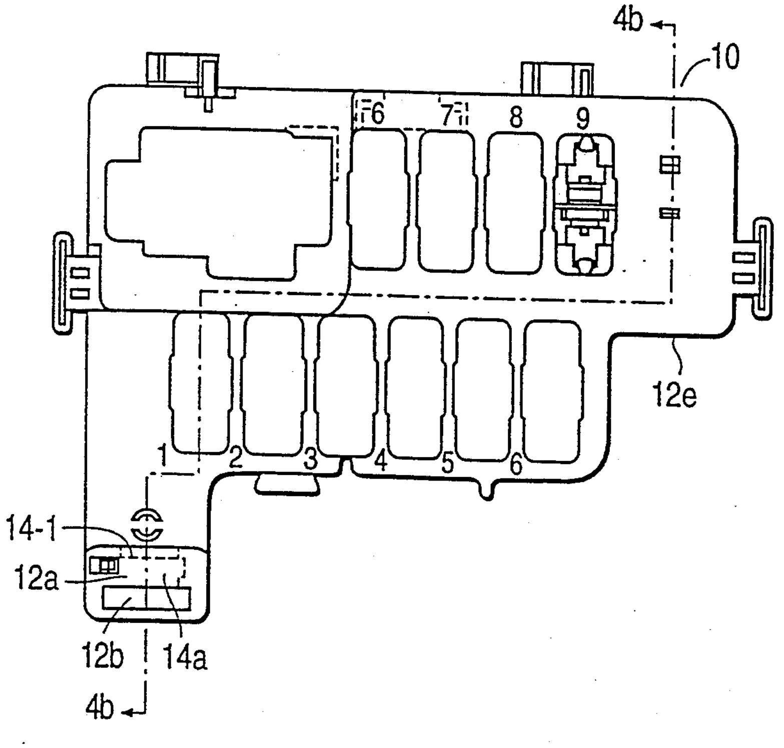
FIGS. 4*a* and 4*b* show the block case 12 used in the first embodiment, (4*a*) being a plan view and (4*b*) being a cross section.
Figure 4B:
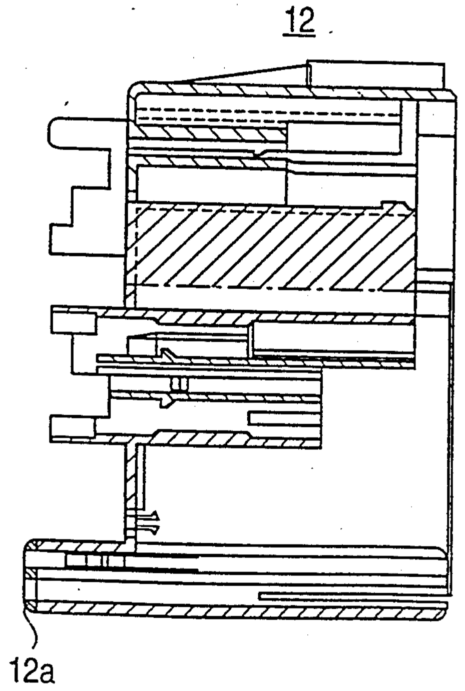

In the form shown in FIGS. 4*a* and 4*b*, the block cases 12 (12-1 and 12-2) of the blocks E and F have a three-step form in their side surfaces which make contact with each other when they are incorporated in the housing 10 (as shown in FIG. 1), and the stepped portion at one end projects in the transverse direction and acts as the bus-bar connection 12*a*.

The above-mentioned bus-bar connection 12*a* has a nut 15 pre-fixed thereupon, and is provided with a bus-bar projection opening 12*b* from which projects the electrical connection 14*a* projecting from the bus-bar 14 housed inside, and is provided with insertion openings 12*c* and 12*d* into which are inserted the bus-bars from the other blocks.

Furthermore, the sunken stepped portion 12*e* on the other end of the block case 12 is provided with a bus-bar projection opening 12*f*.

As described above, the bus-bar 14-1 housed in the block E projects from the bus-bar projection opening 12*b* in the bus-bar connection 12*a*, and meanwhile the electrical connection 14*b* projecting from the bus-bar 14-2 housed in the block F projects from the above-mentioned bus-bar projection opening 12*f*, and projects into the bus-bar connection 12*a* from the above-mentioned bus-bar insertion opening 12*c*. Furthermore, the electrical connection 13*a* of the bus-bar 13 of the above-mentioned block D projects into the bus-bar connection 12*a* from the bus-bar insertion opening 12*d*.

As described above, the electrical connection 13*a* of the bus-bar 13, the electrical connection 14*a* of the bus-bar 14-1 and the electrical connection 14*b* of the bus-bar 14-2 project into the bus-bar connection 12*a*. The electrical connection 13*a* is sandwiched between the electrical connections 14*a* and 14*b*, and the electrical connection 14*a* is positioned so as to make contact with the nut 15. The screw 16 is fastened in the horizontal direction by means of the bolt hole 12*g* formed in the bus-bar connection 12*a*, thereby integrally linking the three bus-bars 13, 14-1 and 14-2.

The above-mentioned block E and block F identical shapes and they are attached having rotated block F through 180 degrees with respect to block E, and therefore projecting bus-bar connection 12*a* can fit into the sunken step 12*e*. The electrical connection 14*b* of the bus-bar 14-2 projecting from the bus-bar projection opening 12*f* provided on the step 12*e* can thus be inserted in the bus-bar connection 12*a* of the block case 12-1.

Figure 5:
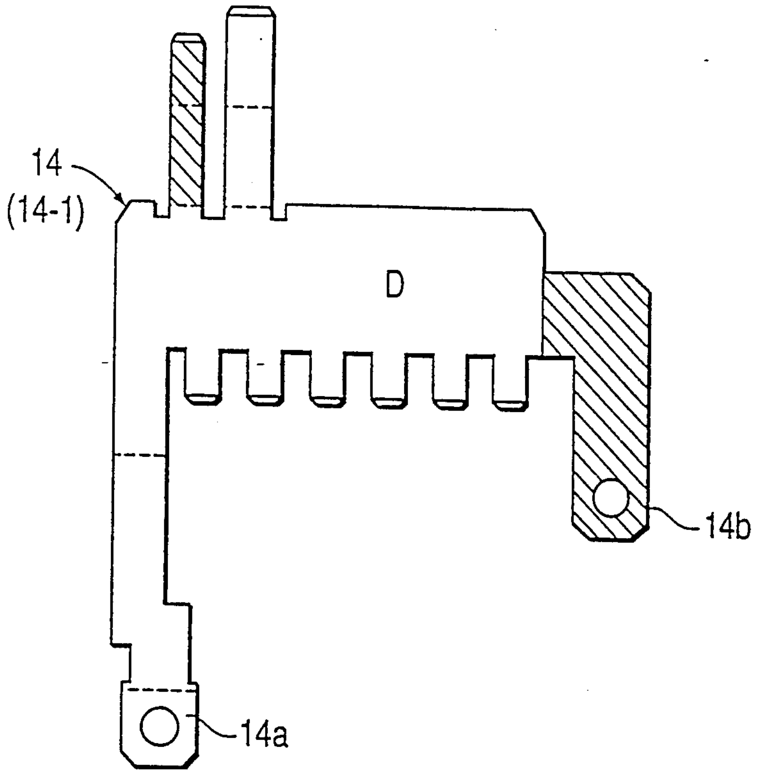
FIG. 5 is a front elevation illustrating the bus-bar 14 of the first embodiment.

The bus-bar 14-1 attached to the block E and the bus-bar 14-2 attached to the block F use identical bus-bars 14 as shown in FIG. 5, and the cross-hatched portions in the figure are cut in the bus-bar 14-1.

Figure 6:
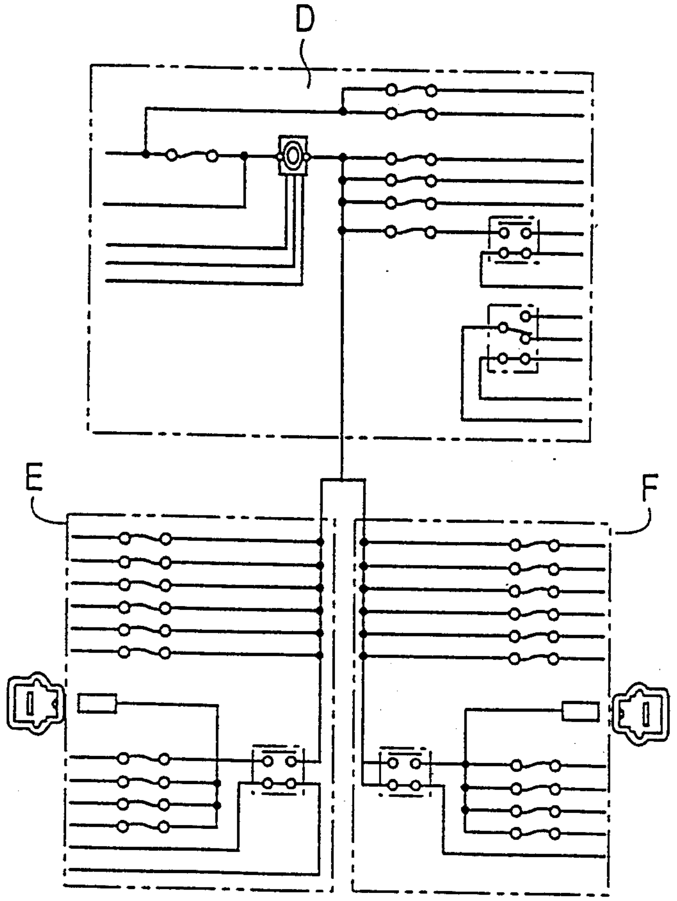
FIG. 6 is a circuit diagram of the first embodiment.

As shown in FIG. 6, the circuitry of the electrical wiring of block E and block F is identical in such a way that it is possible to use identically shaped bus-bars 14 in the different blocks E and F.

Figure 7:
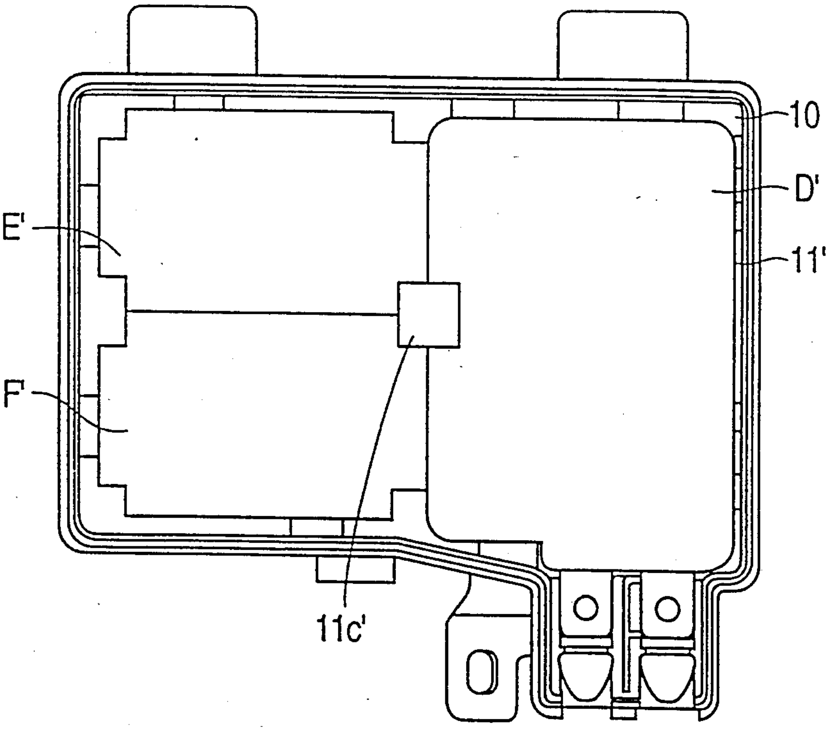
FIG. 7 is a plan view of a branching connection box of a second-embodiment.
Figure 8:
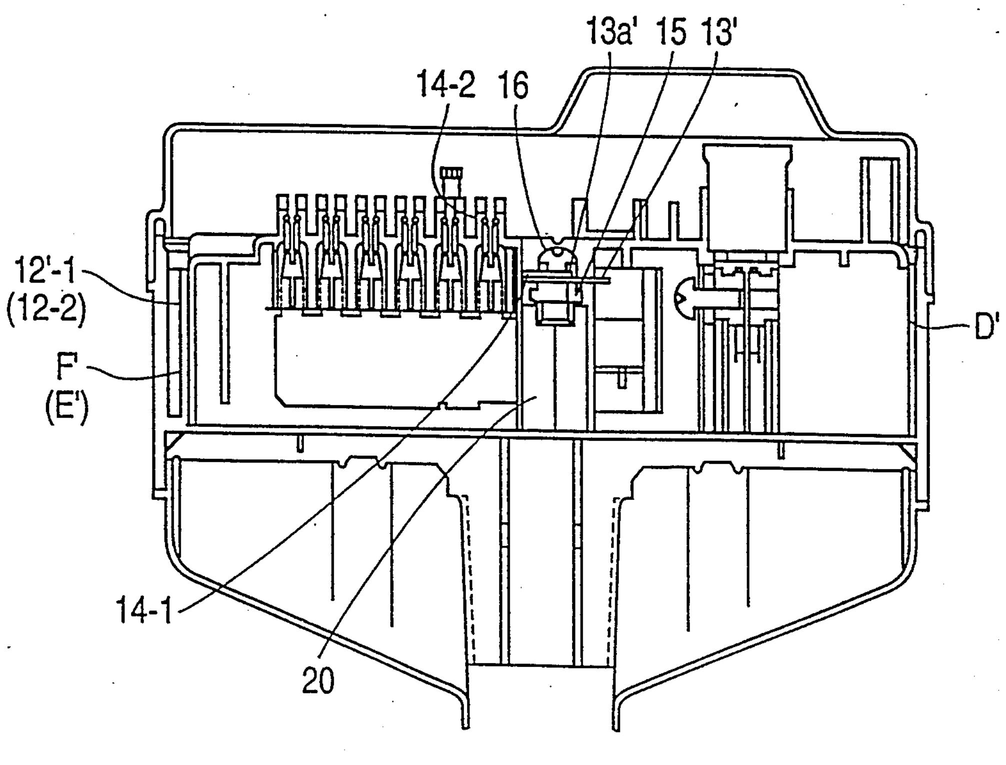
FIG. 8 is a cross section of FIG. 7.
Figure 9:
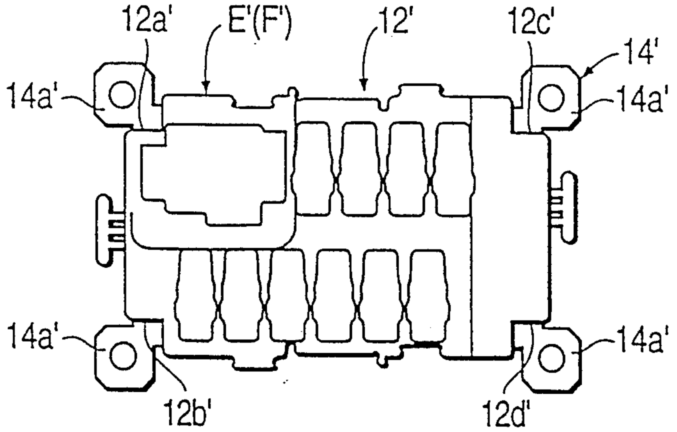
FIG. 9 is a plan view showing the block case and the bus-bar used in the second embodiment.

FIGS.7 to 9 show a second embodiment in which there are three separate blocks D', E' and F' incorporated in the housing 10 of a junction box, as in the first embodiment.

In this second embodiment, a bus-bar connection 11*c*' is provided in the centre on the inside of the block case 11' of the block D, and a nut 15 is fixed in advance inside the said bus-bar connection 11*c*' in the horizontal direction via a nut fixing support 20.

The electrical connection 13*a*' of the bus-bar 13' attached inside the block case 11' projects horizontally with respect to the above-mentioned bus-bar connection 11*c*' so that it is positioned on the top surface of the nut 15, and the bus-bars 14'-1 and 14'-2 attached inside the block cases 12'-1 and 12'-2 of the blocks E' and F' project horizontally in the above-mentioned electrical connection 1l*c*' and these are connected by fastening of a screw 16 from above.

The block cases of the blocks E' and F' and the bus-bars attached to the said block cases have identical forms, as illustrated in FIG. 9.

The block cases 12' are roughly rectangular, and bus-bar projection openings 12*a*', 12*b*', 12*c*' and 12*d*' are formed at the four corners thereof.

Electrical connections 14*a*' which project from the bus-bar projection openings 12*a*' to 12*d*' are formed in the bus-bar 14' attached inside the block case 12'.

Because the electrical connections 14*a*' of the bus-bars 14' project from the four corners of the blocks E' and F' when the above-mentioned configuration of the second embodiment is adopted, it is possible for the electrical connections 14*a*' of the bus-bar to project in the bus-bar connection 11*c*' positioned in the centre of the housing 10 and to stack with the electrical connections of the bus-bars of the other blocks whatever the orientations of the blocks E' and F' incorporated into the housing 10.

Furthermore, even if the bus-bar 14' attached to the block case 12' is altered, the block case 12' is open to more general use if the electrical connections 14*a*' projecting from the bus-bar projection openings of the block case 12' are provided on the said bus-bar 14'.

Figure 10:
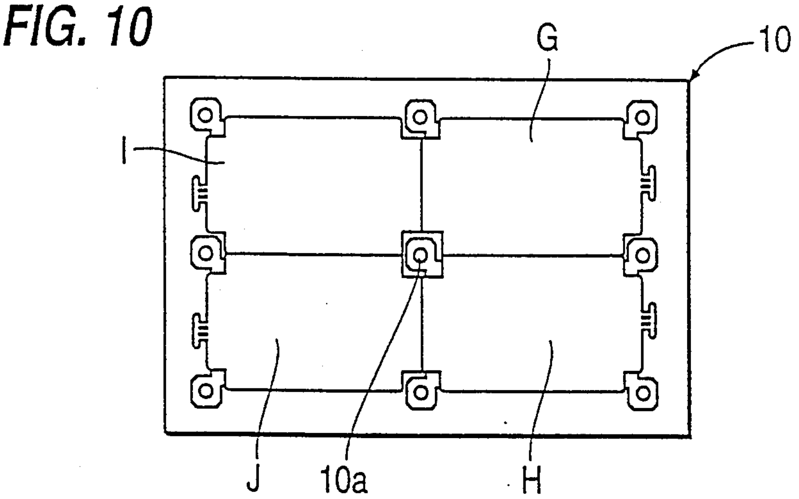
FIG. 10 is an outline view of a third embodiment.
Figure 11:
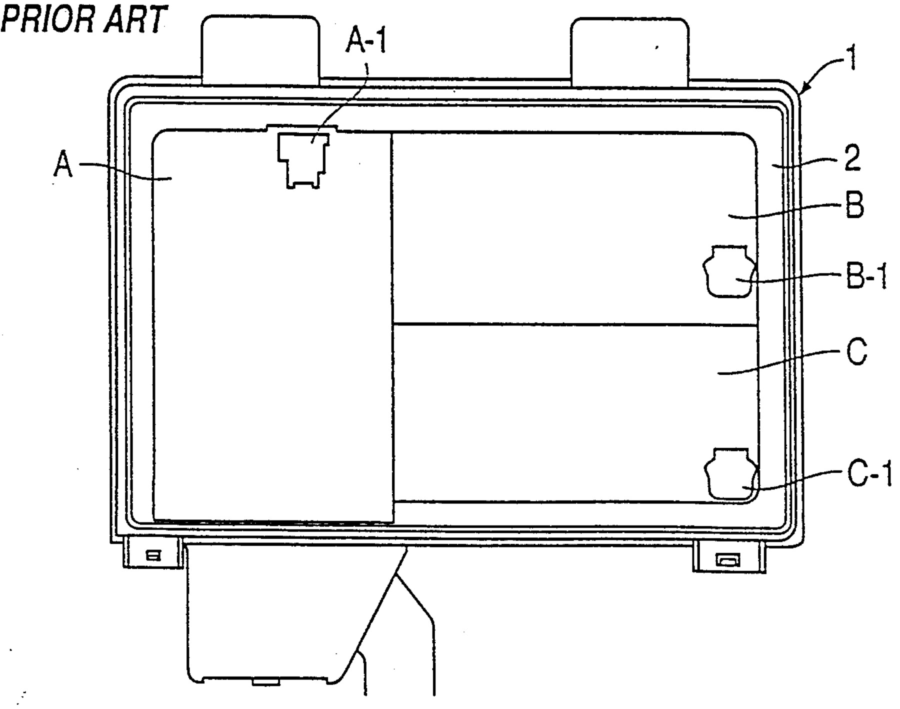
FIG. 11 PRIOR ART
FIG. 11 is a plan view of a conventional branching connection box.
Figure 12:
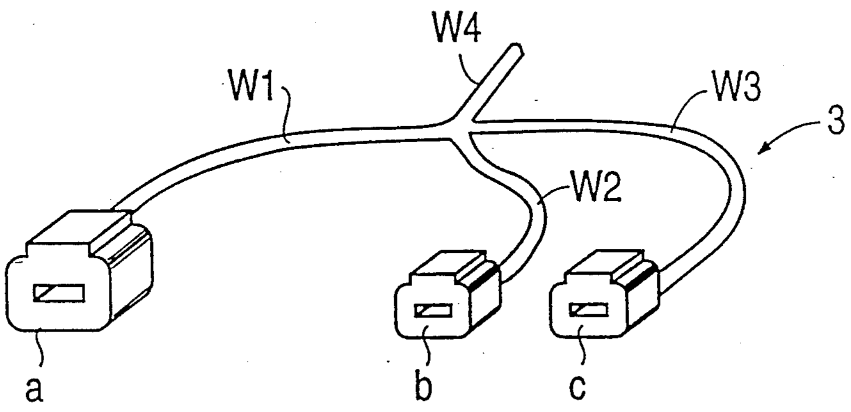
FIG. 12 PRIOR ART
FIG. 12 is an oblique view of the sub-leads used in a conventional branching connection box.
Figure 13:
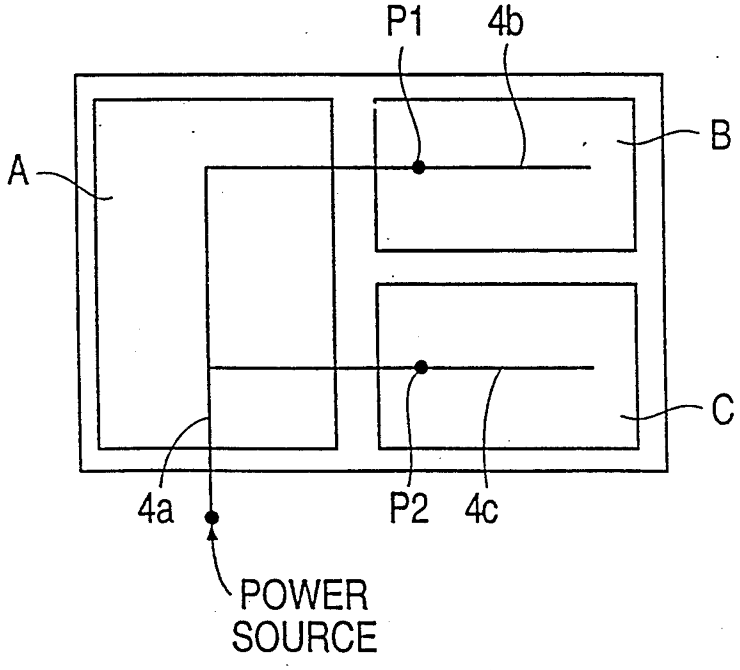
FIG. 13 PRIOR ART
FIG. 13 is an outline view showing the bus-bars of a conventional branching connection box in the screw-fastened state.

In a third embodiment shown in FIG. 10, four separate blocks G, H, I and J are incorporated in the housing of the branching connection box, and the block cases and bus-bars housed therein which are shown in FIG. 9 are used for those of the various blocks.

The electrical connections of the bus-bars projecting from the various blocks are stacked, projecting respectively into the bus-bar connection 10*a* provided in advance in the centre of the housing 10, and are fastened by a screw.

Moreover, bus-bar connections may be provided on one of the block cases of the four blocks.

As is clear from the above description, with the branching connection box according to the present invention, there is no laborious work, since only one screw-fastening operation is required. The bus-bars housed in the separate blocks can be fastened together by screw-fastening in one location in the centre of the branching connection box, and the branching connection box can be made of small dimensions without taking up space since there is one screw-fastening location. In particular, compared to cases of the prior art in which the connection is made using sub-leads, there is no need to provide a housing area for the connector connecting the branching wiring and the coupler and, therefore, there is a reduction in the dimensions of the branching connection box, and there are reduced costs due to the reduction in the number of parts.

Furthermore, if the block cases of the separate blocks and the bus-bars are given identical forms, there need only be one mould for forming the block cases and the bus-bars, and it is possible to achieve reduced costs.

In particular, when using a configuration in which the electrical connections of the bus-bars project from the four corners of the block cases, the electrical connections of the bus-bars can be positioned in the centre of the branching connection box whatever the orientation of the blocks, which makes the blocks open to more general use.

Further, if the bus-bars are housed in the blocks in the longitudinal direction, the electrical connection projecting from these bus-bars are stacked in the longitudinal direction, and screw fastening is carried out in a transverse direction, then space can be reduced in the planar direction. In addition, there are various advantages to using the bus-bar in the longitudinal direction in the blocks as well, for example bending of the bus-bar can be reduced, the blocks can be of reduced dimensions, and the branching connection box overall can be of reduced dimensions.

We claim:

1. An electrical assembly comprising a housing and a plurality of electrical components arranged within the housing, each said electrical component including a block having electrical circuitry and an electrical terminal protruding therefrom, the respective electrical terminals coinciding substantially at the centre of said housing in a stack and being engaged and fastened together directly by a fastener to electrically connect said components.

2. An assembly according to claim 1 wherein each of said terminals include a respective aperture therein, the respective apertures being aligned in the stack, and said terminals being connected by a screw and nut fastener passing through said apertures.

3. An assembly according to claim 2 wherein said nut is fixed against rotation in one of said blocks.

4. An assembly according to claim 1 wherein said blocks are identical and rectangular in shape, each of said blocks having an electrical terminal protruding symmetrically from each of the corners thereof, thus permitting any orientation of blocks in said housing.

5. An assembly according to claim 4 wherein said blocks have identical bus-bars and identical wiring circuits.

6. Assembly according to claim 4 wherein each of said terminals include a respective aperture therein; the respective apertures being aligned in the stack, and said terminals being connected by a screw and nut fastener passing through said apertures.

7. An assembly according to claim 6, wherein said nut is fixed against rotation in one of said blocks.

8. An assembly according to claim 1 wherein a first block is housed in one side of said housing, and identically shaped second and third blocks are housed in the other side of said housing, the electrical terminals of the second and third blocks protruding in opposite directions.

9. An assembly according to claim 8 wherein said second and third blocks have identical bus-bars and identical wiring circuits.

10. Assembly according to claim 8 wherein each of said terminals include a respective aperture therein; the respective apertures being aligned in the stack, and said terminals being connected by a screw and nut fastener passing through said apertures.

11. An assembly according to claim 10, wherein said nut is fixed against rotation in one of said blocks.

12. An assembly according to claim 1 wherein said terminals are arranged in substantially parallel planes, and are fastened together by means extending substantially at right angles to said planes.

13. An assembly according to claim 12 wherein each of said terminals include a respective aperture therein, the respective apertures being aligned in the stack, and said terminals being connected by a screw and nut fastener passing through said apertures.

14. An assembly according to claim 13 wherein said nut is fixed against rotation in one of said blocks.

* * * * *